Patented Nov. 18, 1947

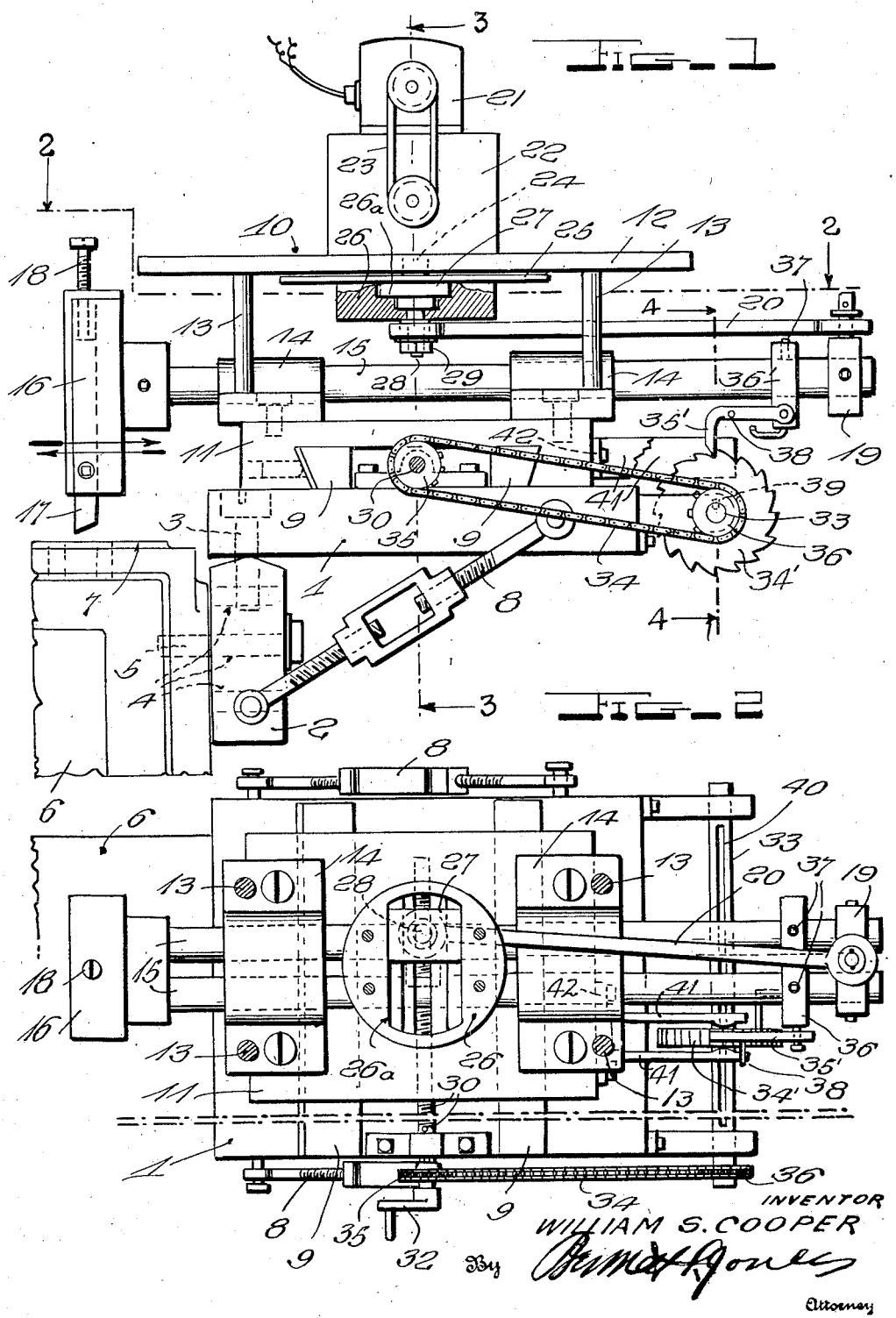

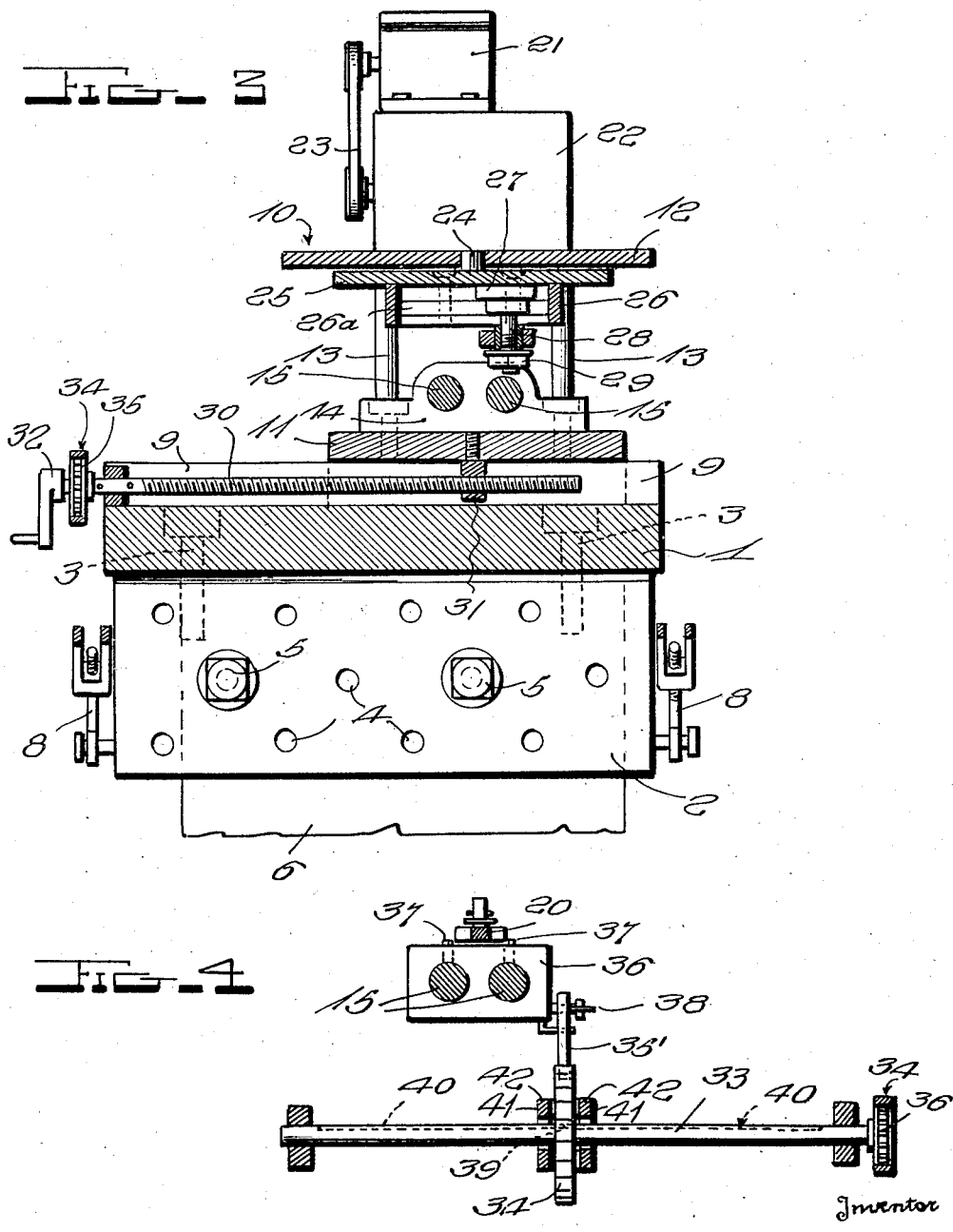

2,431,230

UNITED STATES PATENT OFFICE 2,431,230

PORTABLE PLANER

William Sharp Cooper, East Smethport, Pa.

Application September 14, 1945, Serial No. 616,261

4 Claims. (Cl. 90—41)

This invention relates to improvements in planers or shapers, and especially to planers or shapers of the portable type.

A great deal of time and labor are often lost in machining an object where the object operated on has to be dismantled and transported to a machine shop and transported back again after the work is done and remounted at its original site. This applies, for example, to steam pumps whose valve parts have to be machined, and other like work.

One object of the present invention is to provide a portable planer or shaper which may be readily transported to the site where the work is to be done and applied to the object to be operated on so that the necessity of dismantling, transporting and remounting the object may be avoided and time and labor saved in doing the work.

Another object of the invention is to provide a novel construction of planer or shaper of this character whereby the work to be done may be easily, conveniently and rapidly performed.

The invention consists of the features of construction, combination and arrangement of parts hereinafter fully described and claimed, reference being had to the accompanying drawings, in which:

Fig. 1 is a side elevation with a part shown in section of a planer or shaper embodying the invention.

Fig. 2 is a horizontal section, taken on line 2—2 of Fig. 1.

Fig. 3 is a vertical transverse section taken on line 3—3 of Fig. 1.

Fig. 4 is a vertical transverse section taken on the line 404 of Fig. 1.

Referring now more particularly to the drawings, I designates a supporting base plate or table from the forward portion of which depends an attaching plate 2 suitably secured thereto, as by machine screws 3, which attaching plate is provided with openings 4 for the passage of bolts or machine screws 5 whereby the planer or shaper may be fastened to a steam pump or other piece of work to be operated upon. In the present instance, a steam pump 6 is shown to which the planer is fastened, said pump having a valve seat face 7 which is to be planed. One or more bracing and leveling devices 8, shown in the form of turnbuckle connections, are provided for leveling the table 1 and bracing it from the plate 2.

Fixed to the plate 1 are guide members 9 forming an intervening slideway and slidably mounted for lateral traverse on the plate in said slideway is a carriage 10. This carriage comprises a bottom disk or plate 11, slidably engaging the guide members, a top disk or plate 12 disposed in spaced relation to the disk 11, and supporting legs or uprights 13 extending between and connecting said disks or plates.

Bearings 14 are fixed to the disk 11 and slidably and non-rotatably mounted in said bearings is a ram 15 consisting of a pair of parallel rods connected to slide in unison. The forward ends of these rods have mounted thereon a tool holder 16 carrying the work tool 17 and its adjusting screw 18. Adjustably secured to the rear ends of the rods is a bracket 19 to which is coupled the rear end of a connecting rod 20 whereby the ram is adapted to be reciprocated.

Mounted on the upper disk or plate 12 is a motor 21 and a reduction gear box 22, the latter containing reduction gearing driven by a belt 23 from the motor. The reduction gearing includes a driving spindle 24 to which is fixed a rotary driving disk 25 carrying a crank disk having a slot 26a receiving the head 27 of a motion transmitting member or crank pin 28 clamped by a nut 29 and cooperating securing means to the forward end of the rod 20 whereby in the rotation of the disk 25 reciprocatory motion will be imparted to the ram and tool, the throw or extent of which may be varied by adjustment of the head 27 in the slot 26a. The driving parts above mentioned are conveniently received and housed in the space between the disks 11 and 12, whereby they are shielded and protected against liability of injury in transporting the planer or shaper from place to place.

Extending transversely of and through the guide member 9 is a feed screw 30 for feeding the carriage laterally. This screw is rotatable in fixed bearings and engages a nut 31 on the part 11 whereby in the rotation of the screw lateral feed motion is imparted to the carriage. The screw 30 is provided at one end with an operating handle 32 whereby it may be continuously rotated manually to set the carriage to a prescribed starting position and to return the carriage to such position after each working operation. Gearing is provided for intermittently feeding the carriage in a working operation. This gearing comprises a shaft 33 journaled in fixed bearings on the table 1. A belt 34 passing around pulleys 35 and 36 on the screw 30 and the shaft 33 is provided to transmit motion to the former from the latter. On the shaft 33 is a ratchet wheel 34′ the teeth of which are adapted to be engaged by a feed dog or pawl 35′ pivotally mounted on a bracket sleeve 36' adjustably secured, as by a screw 37 to the ram 15, whereby on successive forward working movements of the ram prescribed intermittent feed motions will be imparted to the carriage. Sleeve 36' may be released and the dog 35' tilted by a handle 38 to a released position to shift the dog for proper action on the ratchet wheel when the working position or movement of the ram is varied. By releasing the bracket 19, and resecuring it in a new position, the working position of the ram, in a forward or rearward direction, may be changed and similarly the position of said bracket on the ram may be changed when the working shape of the ram is varied by adjustment of the member 28, as previously explained. The wheel 34' is mounted to travel laterally with the carriage. To this end said wheel is provided with a spline 39 engaging a slot 40 in the shaft 33 and is disposed between the cheek plates 41 of a bracket 42 fastened to the carriage member 11 whereby the wheel 34' is fitted to rotate with the shaft 33 and be slid therealong by the plates 41 as the carriage is moved by the feed screw 30.

Motor 21 may be an internal combustion motor, an electric motor or any other suitable type of motor, according to conditions or requirements.

From the foregoing description, taken in connection with the accompanying drawings, the construction and mode of operation of my improved planer or shaper will be readily understood by those versed in the art without a further and extended description. As it is adapted to be fastened to the pump or other work to be machined, the necessity of taking down the pump, transporting it to a shop to be machined, retransporting it back and setting it up again at the original site, is avoided, with a material saving in time and labor, and, as an internal combustion driven motor may be used, the planer or shaper may be operated at places where power for driving other types of motors is not available. The planer or shaper also embodies novel features of construction enabling it to be more easily, conveniently and efficiently operated than other devices of its kind, and which is sturdy and compact, enabling it to be transported with facility and without liability of injury to places where it is to be used.

While the structural features disclosed are preferred, it is to be understood that changes in the form, construction and arrangement of the parts may be made, within the scope of the appended claims, without departing from the spirit or sacrificing any of the advantages of the invention.

I claim:

1. A machine of the character described comprising a supporting table, means for detachably securing the same to the work, a carriage mounted to slide laterally on the table and embodying a lower plate and an upper plate spaced from and supported by the lower plate, a tool carrying ram reciprocally supported by the lower plate, motor means mounted on the upper plate and including a drive spindle, and eccentric driving means actuated by said spindle for reciprocating the ram.

2. A machine of the character described comprising a supporting table, a carriage mounted to slide laterally on the table and embodying a lower plate and an upper plate spaced from and supported by the lower plate, a tool carrying ram reciprocally supported by the lower plate, motor means mounted on the upper plate, and eccentric mechanism disposed between said plate and driven by the motor means for operating the ram from the motor means.

3. A machine of the character described comprising a supporting table, a carriage mounted to slide laterally on the table and embodying a lower plate and an upper plate spaced from and supported by the lower plate, a tool carrying ram reciprocally supported by the lower plate, motor means mounted on the upper plate, eccentric driving means disposed between said plates and driven by the motor means for operating the ram from the motor means, and means operated by the ram for intermittently feeding the carriage laterally.

4. A machine of the character described comprising a supporting table, a carriage mounted to slide laterally on the table and embodying a lower plate and an upper plate spaced from and supported by the lower plate, a tool carrying ram reciprocally supported by the lower plate, motor means mounted on the upper plate, eccentric driving means disposed between said plates and driven by the motor means for operating the ram from the motor means, a screw for laterally feeding the carriage, a feed shaft, a ratchet wheel movable with the carriage and slidably mounted on and rotatable with the feed shaft, means for transmitting motion from the shaft to the feed screw, and a dog operated by the ram for intermittently actuating the ratchet wheel.

WILLIAM SHARP COOPER.

REFERENCES CITED

The following references are of record in the file of this patent:

UNITED STATES PATENTS

| Number | Name | Date |
|---|---|---|
| 1,287,342 | Knight | Dec. 10, 1918 |
| 539,998 | Olson | May 28, 1895 |
| 820,330 | Amidon | May 8, 1906 |
| 397,671 | Thorsen | Feb. 12, 1889 |